N. S. DUNAWAY.
MOTOR VEHICLE.
APPLICATION FILED AUG. 29, 1908.
914,933.
Patented Mar. 9, 1909.
3 SHEETS—SHEET 2.
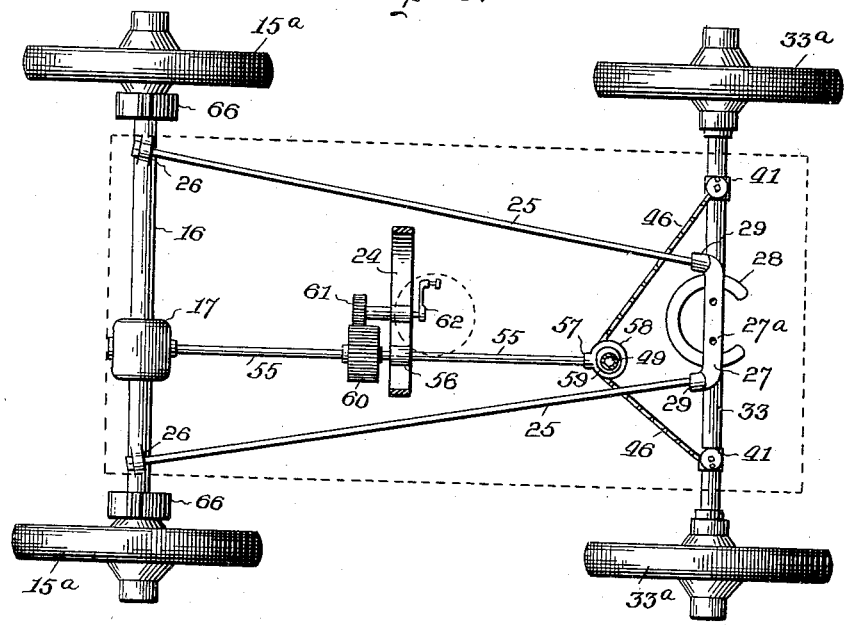
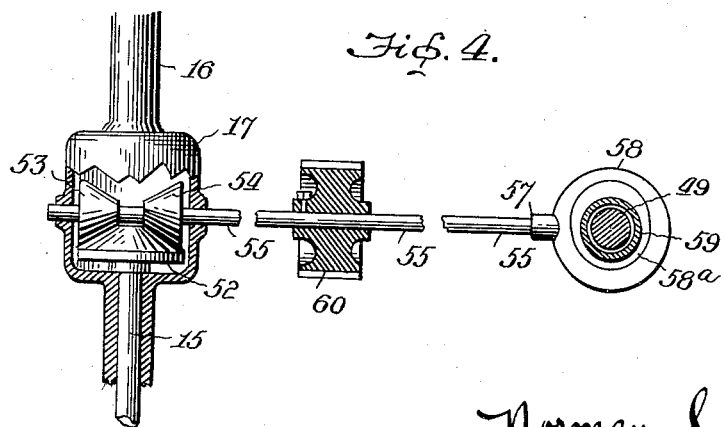

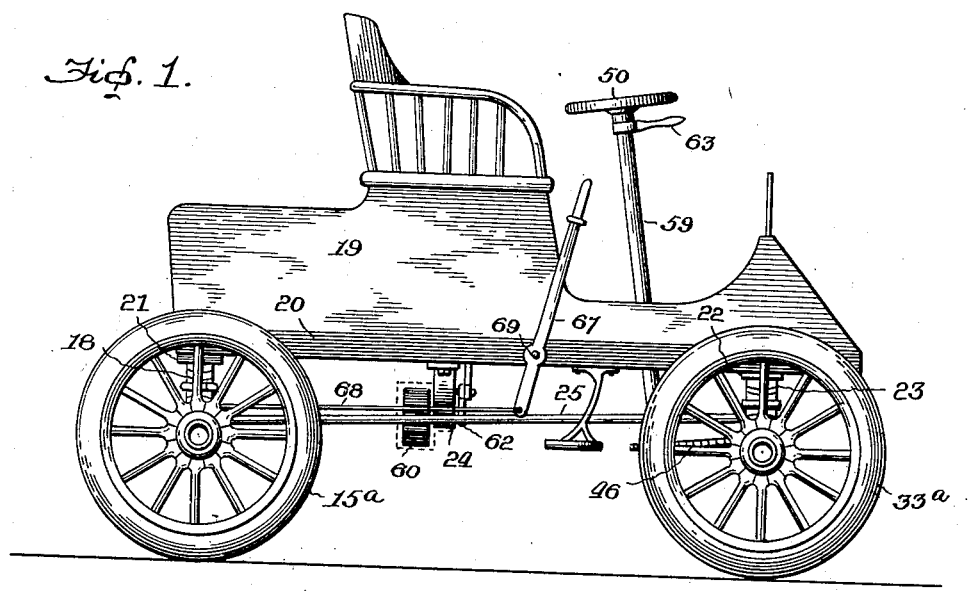
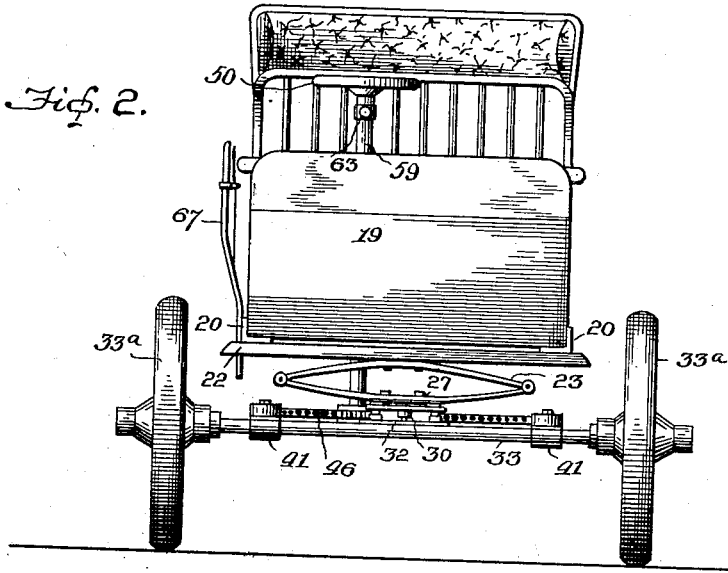

N. S. DUNAWAY.
MOTOR VEHICLE.
APPLICATION FILED AUG. 29, 1908.
914,933.
Patented Mar. 9, 1909.
3 SHEETS—SHEET 3.
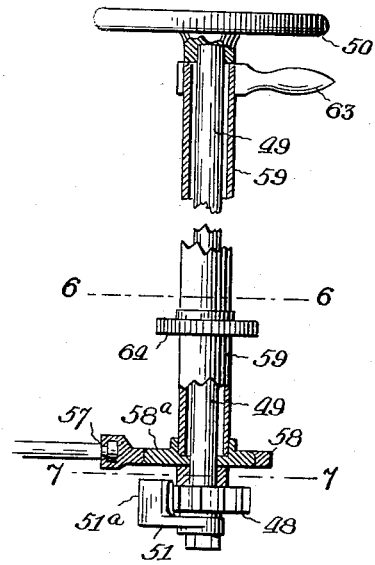
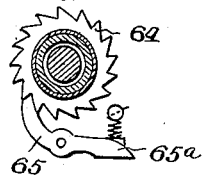
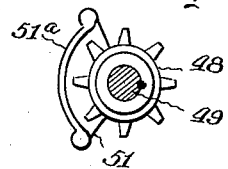
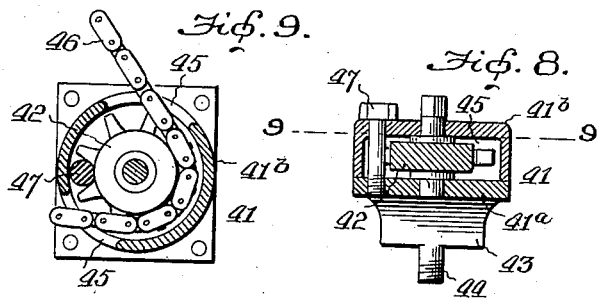
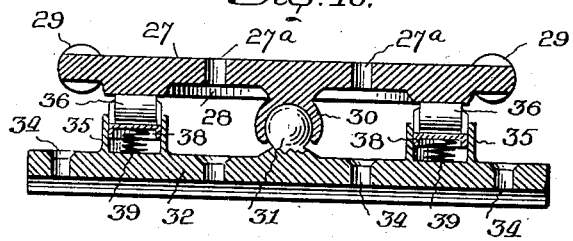
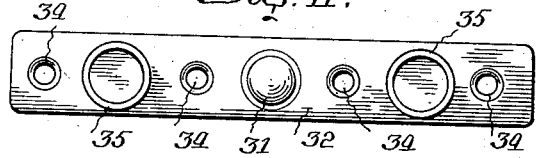
Witnesses
J. E. Price
C. F. Duvall
Inventor
Norman S. Dunaway,
By John D. Thomas & Co.
Attorneys

UNITED STATES PATENT OFFICE.

NORMAN S. DUNAWAY, OF HELENA, ALABAMA, ASSIGNOR OF ONE-HALF TO WILEY TOM JOHNSON, OF HELENA, ALABAMA, AND CHAS. L. SPAIN, OF BIRMINGHAM, ALABAMA.

MOTOR-VEHICLE.

No. 914,933.  Specification of Letters Patent.  Patented March 9, 1909.

Application filed August 29, 1908. Serial No. 450,840.

*To all whom it may concern:*

Be it known that I, NORMAN S. DUNAWAY, a citizen of the United States, residing at Helena, in the county of Shelby and State of Alabama, have invented a Motor-Vehicle, of which the following is a specification.

My invention is an improvement in vehicles, and relates more especially to that particular class which are propelled by a motor or engine carried by the vehicle and geared to the driving-wheels thereof, and in which such vehicle is guided through the intervention of steering mechanism connected to the front axle and operated by a person occupying the seat.

The primary object of my invention is the production of a motor vehicle which can be built at comparatively small cost, and of such simple construction that it will be light, consistent with required strength and durability, positive in operation, and easily adjustable to take up for ordinary wear of parts.

With this primary object in view my invention contemplates a peculiar construction and arrangement of mechanism for transmitting the power of the engine or motor to the rear driving-axles, in connection with means for operating the same controlled by a lever located convenient to the operator occupying the seat of the vehicle.

My invention further contemplates the employment of simple and effective steering mechanism which is operated by the conventional wheel and post, and comprises a novel form of fifth-wheel device by which the front axle which carries the steering-wheels is pivotally connected to the body of the vehicle, in conjunction with a sprocket-chain and connections for turning the axle by the operation of the steering-post.

The particular construction and operation of those parts of the motor vehicle which constitutes my invention will be hereinafter fully described in detail, and what I claim as new and desire to secure by Letters-Patent will be specifically set forth in the appended claims.

In the accompanying drawings, which form a part of this specification: Figure 1 is a side elevation of a motor-vehicle or auto-carriage embodying my invention. Fig. 2 is a front elevation thereof. Fig. 3 is a plan view, with the body of the vehicle removed so as to clearly show the transmission gear and steering mechanism. Fig. 4 is an enlarged detail view of the transmission gear. Fig. 5 is an enlarged view of the steering-post and parts carried thereby, partly in section. Fig. 6 is a sectional view on the line 6—6 of Fig. 5, to show the pawl and ratchet device hereinafter referred to. Fig. 7 is a sectional view on the line 7—7 of Fig. 5, to show the sprocket-wheel which is fixed to the lower end of the steering-post. Fig. 8 is an enlarged vertical sectional view through one of the devices which form a part of the steering mechanism. Fig. 9 is a horizontal sectional view through said device, on the line 9—9 of Fig. 8, and including the chain connection. Fig. 10 is an enlarged vertical sectional view through the fifth-wheel device for pivotally and yieldingly connecting the front axle to the body portion of the vehicle. Figs. 11 and 12 are details of certain parts comprised in Fig. 10, and hereinafter specifically referred to.

Like numerals of reference indicate like parts in all the figures of the drawings.

As will appear hereinafter my present invention consists primarily in the construction and disposition of parts comprising the transmission-gear and steering mechanism, and as I lay no claim to the motor and its accessories they are not herein shown, it being understood, of course, that any type of engine, either internal combustion or steam, may be employed.

In carrying out my invention, the rear driving-axles 15, carrying the rear wheels 15ª, are inclosed and suitably journaled in a casing 16, the latter being provided in the present instance with a housing 17 to receive the gearing, hereinafter described, by which the power driven-shaft is connected to said axles. Bolted to the casing 16 is an elliptic-spring 18, for yieldingly supporting the rear end of the body 19 of the vehicle. In the present instance the body rests upon longitudinal L-beams 20, which are connected at their rear ends by a flat cross-bar 21, to which the aforesaid elliptic-spring 18 is bolted, and near their forward ends said angle or L-beams are connected by a flat cross-bar 22 to which is bolted an elliptic spring 23 for yieldingly supporting the front of the vehicle-body; while at an intermediate point there is connected to said angle-beams a drop-hanger or bracket 24, for the purpose hereinafter explained. The front elliptic-spring 23 rests upon and is bolted to one part of the fifth-wheel or pivotal connection for the front axle, and the reach-bars 25 are secured at their rear ends to the axle-casing 16, as at 26, and at their forward ends to that part of the fifth-wheel to which the aforesaid front elliptic-spring is bolted. As will be seen the body 19 of the vehicle simply rests upon and is bolted to the angle beams 20, and may be readily removed therefrom, either for the purpose of substituting a different style body or for convenience in getting at the mechanism for examination and repair. In the present instance I have shown a body of that type commonly termed a "runabout", but it will be understood, of course, that the L-beams may be longer for the purpose of receiving a body having additional seating capacity.

The front elliptic-spring 23 is bolted directly to a plate 27, which latter in connection with the circle-plate 28 formed integrally therewith comprises the upper member of the fifth-wheel. The plate 27 is provided, preferably at its ends, with reach-sockets 29, to which the reach-bars 25 are connected, and centrally said plate is formed with a depending socket 30 adapted to receive a ball 31 formed on the other or lower member of the fifth-wheel. This lower member 32 consists of a plate concave laterally on its under-side to fit upon the front axle 33, and is provided with holes 34 through which the screws pass for securing the same to said front axle. The member 32 is also formed with cups 35 located a distance from the ball and socket joint so that the circle-plate 28 will be disposed thereabove, and within these cups or cavities so formed are spring-pressed rollers upon which the circle-plate bears. In the present instance each roller, as 36, is journaled in ears 37 projecting upwardly from an inverted cup-shaped device 38 fitting within the cup-shaped projection 35 and movable vertically therein. Interposed between the upper part of the inverted cup-shaped device 38 and the bottom of the cavity or cup 35 is a strong coiled spring 39, adapted to press the roller up against the circle-plate, and it will be noted that the downward movement of the roller-carrier is limited by contact with the bottom of the cup or cavity. The bolts which connect the upper member of the fifth-wheel to the front elliptic-spring pass through the holes 27ª in the plate 27 of the upper member of the fifth-wheel. As will be readily understood this form of fifth-wheel not only provides for easily turning the front axle by reason of the anti-friction rollers on which the circle-plate bears, but by reason of the ball and socket joint, in connection with the spring-pressed rollers the upper part of the fifth-wheel upon which the front end of the body of the vehicle is supported may yield laterally, thus augmenting the action of the front elliptic-spring by permitting the springs 39 to take up any sudden jar when one of the front-wheels passes over an obstruction.

The form of fifth-wheel hereinbefore described is especially adapted in connection with the steering-mechanism hereinafter described, but it will be understood, of course that the same can be used in connection with other vehicles than those driven by a motor.

Mounted upon the front axle 33, at opposite sides of the fifth-wheel hereinbefore described, are devices for connecting the ends of a sprocket-chain 46 to said front axle, (see Figs. 8 and 9), said connecting devices each comprising a two-part casing 41 adapted to inclose a small sprocket-wheel 42, the lower part 41ª being rectangular in shape and provided with depending flanges 43 having the threaded lugs 44 by which the device is clamped to the axle, while the upper part, 41ᵇ, is cylindrical and provided with triangular shaped flanges (see Fig. 9) by which it is securely riveted to the part 41ª. The sprocket-wheel 42 is provided with gudgeons, as shown, by which it is journaled horizontally in the casing, and the upper part of the latter is provided in its sides with openings 45 so that the sprocket-chain 46 may pass into the casing and engage the sprocket-wheel. For the purpose of adjusting the sprocket-wheel and for holding the same firmly after adjustment I provide a removable bolt 47, which passes through the upper part of the casing and is threaded in the lower part thereof, said bolt engaging between any two of the teeth of the sprocket-wheel; and for convenience in turning said sprocket-wheel the upper gudgeon is extended beyond the casing and squared, as shown, to receive an ordinary wrench. The sprocket-chain 46 passes around a sprocket-wheel 48 fixed to the lower end of a steering-post 49, the latter having fastened at its upper end an ordinary form of hand-wheel 50. In order to prevent the sprocket-chain from becoming disengaged from the sprocket-wheel 48, by reason of such chain stretching in use, I provide a guard 51, which is loosely mounted on the lower end of the steering-post and consists of a horizontally-disposed segment-plate having a vertical flange 51ª which extends partially around the sprocket-wheel, the ends of said flange being flared so as not to bind against the chain but permit it to freely turn with the sprocket-wheel.

The operation of this steering mechanism will be readily understood, for inasmuch as the ends of the sprocket-chain 46 are secured to the front axle, and said chain passes around the sprocket-wheel secured on the lower end of the rotatable steering-post the turning of the latter in either direction will through the medium of said chain draw upon the axle and swing the same so as to deflect the guide-wheels 33ª, the axle turning on the fifth-wheel. By the particular construction of the fifth-wheel device the axle 33 may be easily turned, and the swaying of the body of the vehicle taken up by the spring-pressed rollers forming a part of the fifth-wheel device. When the sprocket-chain stretches the slack can be readily taken up at either or both ends by simply removing the bolt 47 and turning the sprocket-wheel 42 so as to draw upon the chain, the sprocket wheel being turned by means of an ordinary nut-wrench placed in engagement with the squared upper end of the gudgeon. When the sprocket-chain has been tightened to the desired extent the bolt is threaded in place between two of the teeth of the sprocket-wheel. As will be seen by reference to Fig. 9 the end of the sprocket-chain extends partially around the sprocket-wheel and is retained in engagement therewith, against slipping off when slack, by means of the segmental wall between the openings 45. This particular arrangement not only provides a very strong and secure fastening for the end of the chain, but also provides a very convenient means for readily tightening or adjusting the chain. This particular form of steering mechanism, including the fifth-wheel, and sprocket-chain connection with the steering-post, not only forms a very simple and cheap construction, but also one that is very strong and durable, thereby increasing the dependability of an important part of a vehicle of this character.

Located in the housing 17, and connected to the driving axle 15 is a large conical wheel or beveled bull-wheel 52, and with the beveled surface of this wheel at opposite sides of its center are adapted to engage conical rollers 53 and 54 which are fixed on a driven shaft 55 passing transversely through the housing and movable longitudinally. This shaft extends forwardly through a bearing 56 in the drop-hanger or bracket 24, and is rotatably connected, as at 57, (Fig. 5), to an eccentric 58; one member, as 58ª, of said eccentric being rigidly secured to a tubular post 59, inclosing the steering-post 49 hereinbefore referred to. The shaft is driven from a suitable motor (not shown but indicated in dotted lines Fig. 3) by means of a wide gearwheel 60 on the shaft meshing with a pinion 61 on a crank-shaft 62 driven directly by the motor or engine, said wide gearwheel allowing for a longitudinal movement of the shaft without disengaging the gearwheels. In the operation of this transmission gear, the shaft 55 being driven constantly in one direction the vehicle will be propelled forward when one of the driven conical rollers, as 53, is moved into frictional engagement with the beveled bull-wheel 52, and will be propelled rearwardly when the other conical roller, as 54, is moved into engagement with said beveled bull-wheel, it being understood, of course that when either conical roller is moved into engagement with the wheel the other is released, and that an intermediate or neutral position will release both; the operation of throwing the conical-rollers in and out of frictional engagement with the beveled bull-wheel being effected by turning the tubular post or standard 59 which operates the eccentric. Instead of an eccentric I may, in some instances, employ an ordinary crank connection between the operating post or standard 59 and the shaft, and, also, may employ a separate or independent operating shaft in lieu of the tubular post. However, it will be found that the arrangement shown is preferable. For the purpose of turning the tubular post 59 it is provided with a handle 63, secured to the upper end thereof and located below the hand-wheel 50, said handle projecting forwardly in its normal or neutral position. In order to hold the tubular post when turned in one direction it is provided with a ratchet-wheel 64 engaged by a spring-actuated pawl 65, the latter having a toe-piece 65ª for releasing the same by pressure of the operator's foot thereagainst. This ratchet-wheel serves to hold the post when the same is turned in that direction to engage the conical-roller 53 with the beveled bull-wheel, so as to propel the vehicle forward, and of course when it is desired to back the vehicle it is only necessary to hold the pawl released while the tubular post is turned in the reverse direction and held manually. Suitable differential gearing is installed between the beveled bull-wheel and other driving-axle.

The hubs of the rear driving-wheels 15ª are each provided with an ordinary form of band-brake 66, operated by a lever 67 through the medium of a connecting-rod 68, the lever being fulcrumed on a pin 69 projecting from an angle-beam 20 of the vehicle-body. The construction of the band-brake is of a conventional form, and illustration thereof herein is unnecessary.

The gearwheels 60 and 61 may be inclosed in a suitable casing, as indicated in dotted lines in Fig. 1 of the drawings, so as to protect said gears from dirt and dust.

From the foregoing description, in connection with the accompanying drawings, the construction, operation, and practical advantages of my invention will be readily understood, and it will be seen that by the particular construction and arrangement of parts I am able to provide a motor vehicle or auto-carriage that can be built at comparatively small cost, can be easily operated, and will be serviceable and durable in use.

Having thus described my invention, what

I claim as new and desire to secure by Letters-Patent, is:—

1. In a motor-vehicle, the combination with the body and front axle connected by a fifth-wheel or pivotal connection, of attaching devices secured on the front axle near the opposite ends thereof, a steering-post having a sprocket-wheel fixed thereto, a segment-plate loosely mounted below the sprocket-wheel and having a flange extending partially around the latter, and a sprocket-chain secured at its ends to the attaching devices and passing around the sprocket-wheel within the aforesaid flange, substantially as shown and described.

2. In a motor vehicle, the combination with the body and front axle connected by a fifth-wheel or pivotal connection, of casings secured to the axle near opposite ends thereof, and each having a sprocket-wheel therein, means for adjusting the sprocket-wheel rotatably in the casing; together with a steering-post, a sprocket-wheel fixed thereto, and a sprocket-chain passed around the sprocket-wheel on the steering-post and at its ends engaging the sprocket-wheels in the casings on the front-axle, substantially as shown and for the purpose set forth.

3. In a motor vehicle, the combination with the body and front axle connected centrally by a fifth-wheel or pivotal connection, of casings secured to the axle near opposite ends thereof, said casings having openings at opposite sides, a sprocket-wheel mounted in each casing and rotatable therein, and a bolt passing through the casing and engaging between any two of the sprocket-teeth of the aforesaid sprocket-wheel; together with a steering-post having a sprocket-wheel fixed thereto, and a chain passing around said sprocket-wheel and engaging at its ends the sprocket-wheels in the casings through the openings in the latter, substantially as shown and described.

4. In a motor vehicle, the combination with the swiveled front axle and sprocket-chain for turning the same, of a device for adjustably connecting an end of the sprocket chain to the front axle, comprising a casing having openings in its opposite sides, a sprocket-wheel rotatably mounted in the casing and having a projecting gudgeon squared at its end, and a bolt removably secured in the casing so as to engage between two of the teeth of the sprocket-wheel, the end of the sprocket-chain engaging the sprocket-wheel through the openings in the casing, substantially as shown and described.

In testimony whereof I have signed my name to this specification in the presence of two subscribing witnesses.

NORMAN S. DUNAWAY.

Witnesses:
N. L. RUFFIN,
M. E. ROY.